(12) United States Patent
Carlon (10) Patent No.: US 10,048,510 B2
(45) Date of Patent: Aug. 14, 2018

(54) FOLDING EYEGLASSES

(71) Applicant: Roberto Carlon, Venice (IT)

(72) Inventor: Roberto Carlon, Venice (IT)

( * ) Notice: Subject to any disclaimer, the term of this patent is extended or adjusted under 35 U.S.C. 154(b) by 0 days.

(21) Appl. No.: 15/108,734

(22) PCT Filed: Dec. 24, 2014

(86) PCT No.: PCT/IB2014/067311
§ 371 (c)(1),
(2) Date: Jun. 28, 2016

(87) PCT Pub. No.: WO2015/101910
PCT Pub. Date: Jul. 9, 2015

(65) Prior Publication Data
US 2016/0320631 A1 Nov. 3, 2016

(30) Foreign Application Priority Data

Dec. 31, 2013 (IT) .............................. BO2013A0724

(51) Int. Cl.
*G02C 5/08* (2006.01)
*G02C 5/10* (2006.01)
(Continued)

(52) U.S. Cl.
CPC ............... *G02C 5/08* (2013.01); *G02C 5/006* (2013.01); *G02C 5/10* (2013.01); *G02C 5/143* (2013.01);
(Continued)

(58) Field of Classification Search
CPC . G02C 5/006; G02C 5/02; G02C 5/06; G02C 5/08
(Continued)

(56) References Cited

U.S. PATENT DOCUMENTS 1,421,744 A * 7/1922 Styll .................... G02C 5/04
351/126
1,625,614 A * 4/1927 King ................... G02C 5/003
351/126
(Continued)

FOREIGN PATENT DOCUMENTS

CN 203164531 U 8/2013
DE 376978 C 6/1923
(Continued)

OTHER PUBLICATIONS

International Search Report, dated Aug. 18, 2015, from corresponding PCT Application.

*Primary Examiner* — Darryl J Collins
(74) *Attorney, Agent, or Firm* — Young & Thompson (57) ABSTRACT

Eyeglasses (10), in particular of the folding type, composed of a front part (11) including respective lens elements (12, 12) and elements (14, 14) for hooking to the wearer's face, the front part (11) including first and second lens elements (12, 12) which are connected to each other by corresponding bridge members (16) including a respective bridge body (18) and elements (20, 20) for fastening the bridge body to the respective first and second lens element (12, 12). The elements for fastening the body to the respective first and second lens elements (12, 12) include, or are in the form of, corresponding wire-like members, in particular metal wire (20, 20), which are adapted to define respective elements for articulating and rotating the bridge body (18) relative to the lens elements (12, 12).

16 Claims, 5 Drawing Sheets

(51) Int. Cl.
*G02C 5/00* (2006.01)
*G02C 5/14* (2006.01)
*G02C 5/22* (2006.01)
*G02C 5/20* (2006.01)

(52) U.S. Cl.
CPC .............. *G02C 5/20* (2013.01); *G02C 5/2254* (2013.01); *G02C 2200/10* (2013.01)

(58) Field of Classification Search
USPC ................................... 351/124–135, 65, 110
See application file for complete search history.

(56) References Cited

U.S. PATENT DOCUMENTS

| | | | | |
|---|---|---|---|---|
| 1,666,826 A * | 4/1928 | Lemay | ................... | G02C 5/006 351/64 |
| 1,838,646 A * | 12/1931 | Walsh, Jr. | .............. | G02C 5/045 2/445 |
| 1,971,389 A * | 8/1934 | Shindel | ................. | G02C 5/045 351/127 |
| 2,166,110 A | 7/1939 | Baldanza | | |
| 2,297,338 A | 9/1942 | Willson | | |
| 5,231,429 A * | 7/1993 | Kanda | ..................... | G02C 5/006 351/118 |
| 6,135,592 A * | 10/2000 | Preutz | ..................... | G02C 1/02 351/111 |
| 7,264,348 B2 * | 9/2007 | Perie | .................... | G02C 5/2272 351/110 |
| 7,287,851 B2 * | 10/2007 | Amioka | ................. | G02C 5/006 351/114 |
| 8,210,676 B1 * | 7/2012 | Hunt | ....................... | G02C 3/02 2/209.13 |
| 2004/0051843 A1 * | 3/2004 | Carlon | ..................... | G02C 1/02 351/124 |

FOREIGN PATENT DOCUMENTS

| | | |
|---|---|---|
| GB | 342 468 A | 2/1931 |
| KR | 10-2012-0033370 A | 4/2012 |
| WO | 02/21193 A1 | 3/2002 |
| WO | 2012/127416 A1 | 9/2012 |

* cited by examiner

FOLDING EYEGLASSES

TECHNICAL FIELD

This invention relates to eyeglasses, in particular of the foldable type.

BACKGROUND ART

In the eyeglasses sector there are prior art eyeglasses, in particular for reading, of the foldable type, which consist of a front part comprising respective lens means, in particular a first and a second lens, connected to a respective bridge, and means for fastening to the face of the wearer, in particular comprising respective temple portions for engaging the ears or head of the wearer.

Normally, eyeglasses of the foldable type are particularly advantageous since, when folded and placed in the corresponding case, they have quite small dimensions and are therefore easily carried by the user inside luggage or bags.

Normally, eyeglasses of the foldable type comprise respective temple portions for attaching to the face of the wearer, which are composed of a plurality of parts, in particular by a first and a second part, which are foldable one relative to the other, that is, which are telescopically withdrawable, relative to each other.

In both cases, the parts making up the temple portion are made of the same material and have the same homogeneous appearance, in the latter case with considerable limitations for the creative solutions chosen by the designers who make these type of eyeglasses.

Moreover, this type of foldable eyeglasses normally has a bridge for connecting between the lenses, which comprises respective suitable nosepieces, usually soft, engaging on the wearer's nose, and which is articulated relative to the lenses or frame supporting the lenses using respective hinges, which are usually made with corresponding screws which are inserted in corresponding holes provided in the bridge and in a corresponding portion of extension from the frame of the lens.

One problem seen in relation to these types of foldable eyeglasses concerns their excessive weight and that it would be desirable to reduce it as much as possible.

Another problem seen in connection with prior art foldable eyeglasses, which are subject to many and articulated and repeated opening operations, in view of the use, and subsequent closing, for housing them in corresponding cases, concerns the ease with which they are broken or dismantled, in particular at the hinge points, due to the unscrewing of the articulation pins at the bridge, that is to say, due to the unscrewing of the hinge pins provided on the temple portion for fastening to the wearer's face.

Moreover, in general in the eyewear trade, a general need is felt for eyeglasses where the connection between the sidepieces and the lenses, or the lens mount, is at once elegant and unobtrusive, easy to make and/or practical to use.

The trade also feels the need for eyewear in which the connection between the sidepieces and the lenses, or the lens mount, does not, unlike traditional eyewear, require the use of fastening screws, which are easily loosened and lost, glue, which wears off and allows detachment of parts, and welds, which create weak points that break very easily.

The need is also felt in this sector for eyeglasses which are particularly light and/or comfortable when worn.

The need is also felt in this sector for eyeglasses with which it is possible to avoid the use of an excessive number of components.

Moreover, the need is felt in the sector for eyeglasses in which weak parts, for example the lenses, do not break due to excessively high stresses which are imparted on the lenses by the elements of the frame and/or due to their continuous use.

In particular, the trade feels the need for eyewear with sidepieces and/or lens mounts made of a rigid, though fragile, substance such as horn or the like but without the risk of undesired breakages.

SUMMARY OF THE INVENTION

This invention proposes a novel solution, alternative to the solutions known up to now and which can overcome one or more of the above mentioned disadvantages and/or meet one or more of the requirements mentioned in or inferable from the above.

Eyeglasses, in particular of the folding type, are therefore provided composed of a front part comprising respective lens means and means for hooking to the wearer's face, characterized in that the front part comprises first and second lens means which are connected to each other by corresponding bridge means which comprise a bridge body and means for fastening the bridge body to the respective first and second lens means; and in that the means for fastening the bridge body to the respective first and second lens means comprise, or are in the form of, corresponding wire-like means, in particular metal wire, which are adapted to define respective means for articulating and rotating the bridge body relative to the lens means.

In this way, it is possible to make eyeglasses which avoid the use of corresponding articulation screws at the bridge, with consequent advantages in terms of weight and/or durability of the eyeglasses.

More specifically, the use of the wire-like connection means between the bridge and the lens means allows the stresses which the bridge transfers to the lens means and vice versa to be reduced.

BRIEF DESCRIPTION OF THE DRAWINGS

These and other innovative aspects are set out in the appended claims and the technical features and advantages are also apparent from the detailed description which follows of a non-limiting example embodiment of it with reference to the accompanying drawings, in which:

DETAILED DESCRIPTION OF PREFERRED EMBODIMENTS OF THE INVENTION

FIGS. 1A to 4 illustrate a first preferred embodiment 10 of eyeglasses of the foldable type.

As illustrated, the eyeglasses 10 are composed of a front part 11, comprising respective lens means 12, 12, and means 14, 14 for hooking to the wearer's face.

More specifically, the front part 11, as illustrated, comprises first and second lens means, in particular in the form of respective first and second lenses 12, 12, which are configured in a rimless fashion, that is, they do not have any surrounding frame supporting the respective lens.

As illustrated, the lens means 12, 12 are connected to each other using corresponding bridge means 16, which comprise a respective solid bridge body 18 and corresponding means 20, 20 for fastening the body 18 to the respective first and second lens means 12, 12.

Advantageously, the means 20, 20 for fixing the bridge body 18 to the respective first and second lens means 12, 12 comprise, or are in the form of, corresponding wire-like means 20, 20, and in particular are in the form of metal wire means.

Advantageously, the wire-like means 20, 20 for fixing the bridge body 18 to the respective first and second lens means 12, 12 are designed to define respective means for articulation, or rotation, of the bridge body 18 relative to the lens means 12, 12.

More specifically, as may be inferred in relation to the first preferred embodiment, the fixing means 20, 20 are connected directly to the respective lens 12, 12, in particular at a lateral edge thereof which faces towards the inside of the lens, that is, towards the zone in which the bridge 18 extends.

Figure 5:
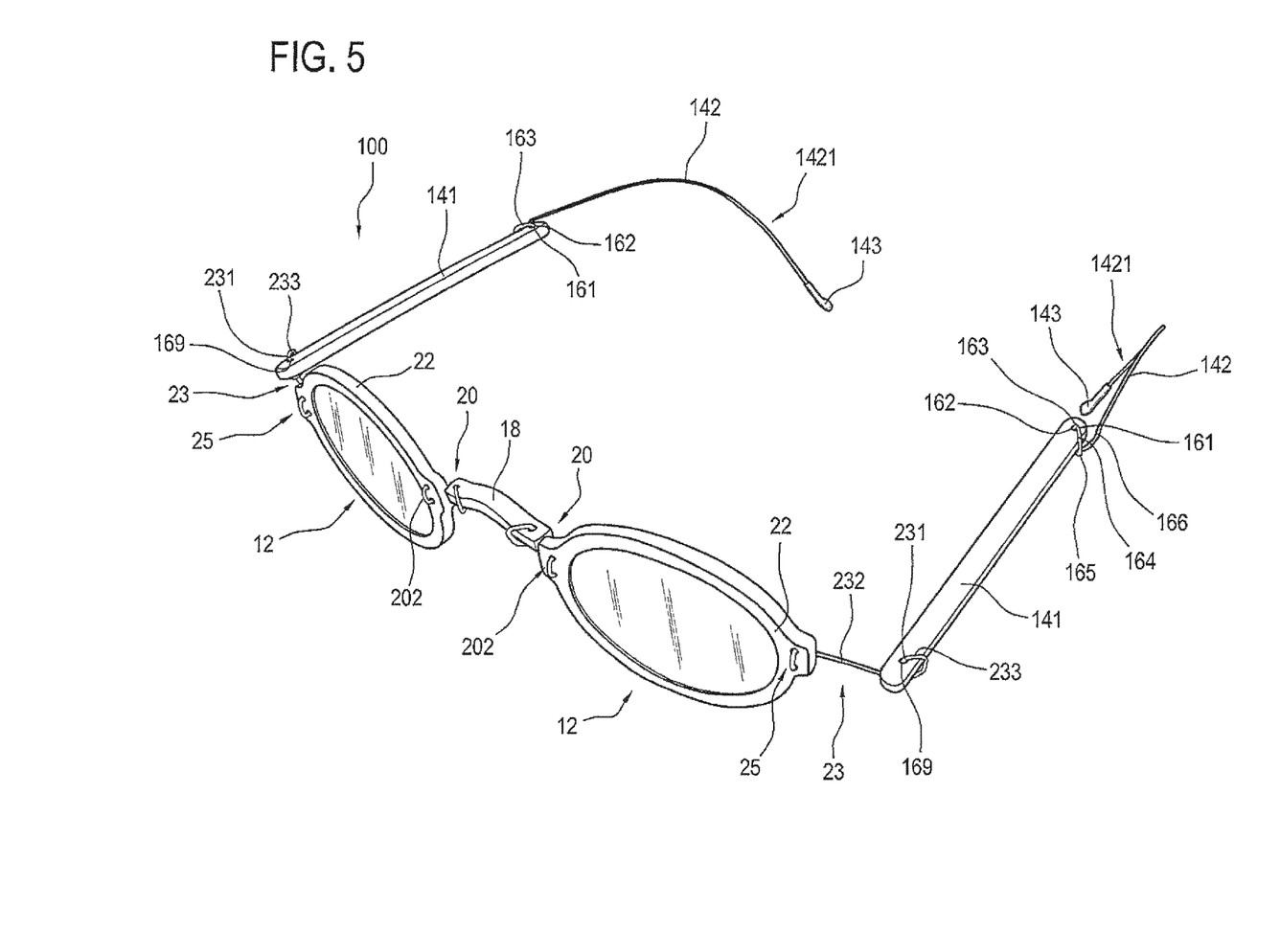
FIG. 5 is a perspective view of a second preferred embodiment of the eyeglasses according to the invention.

Alternatively, according to a second preferred embodiment 100 of the eyeglasses, which is illustrated in FIG. 5, the fixing means 20, 20 can be also connected to a respective frame 22, 22 which supports the respective lens 12, 12.

With regard to this second preferred embodiment of the eyeglasses, the elements or the components which are similar or equivalent to those of the first preferred embodiment are denoted by the same reference numbers as those used in connection with the first preferred embodiment and are not described again in detail.

More specifically, as illustrated, the fixing means 20, 20 of the second preferred embodiment are, in particular, connected at an internal lateral zone of the corresponding frame 22, 22.

More specifically, as may be inferred from FIG. 5, the frame comprises, for each lens, a respective body 22, 22, which, as illustrated, extends circumferentially, or on the perimeter, and supports the respective lens.

Returning therefore to consider the first preferred embodiment of the eyeglasses, it may be seen how, advantageously, the bridge body 18 defines means for resting on the nose of the wearer.

More specifically, the bridge body 18 has an underside surface 181 for resting on the nose of the wearer.

Advantageously, the underside surface 181 of the bridge body is in the form of a curved surface, designed to wrap around the corresponding upper part of the nose of the wearer.

For this purpose, the bridge body 18 has a respective intermediate, or central, portion 191 with an arcuate shape and has, or extends, to form a respective concavity facing, in use, downwards, that is, towards the nose of the wearer.

In this way, there is a handy configuration for supporting and centring on the wearer's nose. Each use of corresponding nose portions is, therefore, avoided advantageously from the point of view of the weight of the eyeglasses and use of an excessive number of components.

Advantageously, the bridge body 18 has corresponding lateral, or end, portions 192, 192, which are designed to form articulation means for the means 20, 20 for fixing to the lens means 12, 12.

As illustrated, the lateral, or end, portions 192, 192 extend from the central portion, in particular arcuate, 191 of the bridge body, in opposite directions on each side of it.

Advantageously, the respective fastening means 20, 20 define a pin portion 201, 201 which is designed for insertion into a corresponding hole 193, 193 made in the bridge body 18, in particular in the respective lateral, or end, portion 192, 192.

More specifically, the articulation hole 193, 193 in the bridge body 18, extends, in use, vertically, or substantially vertically.

Similarly, the pin portion 201, 201 of the fixing means 20, 20 also extends vertically, or substantially vertically.

As illustrated, the bridge body 18 has an underside face 181, a top face 182, a front face 183, a rear face 184, which faces, in use, the wearer's face, and opposite lateral end faces 185, 186.

Advantageously, the articulation hole 193, 193 made in the bridge body 18 is in the form of a respective through hole in the bridge body 18.

More specifically, the same articulation hole 193, 193 is defined by a corresponding cylindrically shaped surface.

Moreover, advantageously, the articulation hole 193, 193, made in the bridge body 18, extends between the underside face 181 and the top face 182 of the bridge, in particular between the underside face and the top face of the respective end or lateral portion 192, 192 of the bridge body.

As illustrated, the end portions 192, 192 of the bridge body 18 are transversally aligned with each other and they are in the form of corresponding portions, in particular short portions, linear or straight, which are suitably joined to the central, in particular arcuate, portion 191 of the bridge.

Advantageously, the means 20, 20 of fastening the bridge body 18 to the respective lens means 12, 12 are fixed or firmly connected to the lens means 12, 12.

More specifically, the means 20, 20 for fastening the bridge body 18 to the respective lens means 12, 12 comprise a respective fastening portion 202, 202, which is in particular in the form of a portion shaped generally like a 'C', which has corresponding longitudinal portions 202a, 202b, which insert into corresponding through holes 202f, 202f extending between the front face 121 and the rear face 122 of the lens means 12, 12, in particular at a respective lateral edge of them, that is, the lateral edge which faces towards the other lens means, that is, towards the intermediate bridge 18.

Moreover, the fastening portion shaped like a 'C' has a perpendicular portion 202c, which extends between the longitudinal portions for insertion in corresponding holes provided in the respective lens and is positioned in front of the respective lens means.

With regard to the second preferred embodiment of the eyeglasses, illustrated in FIG. 5, the respective portion 202 for connecting the bridge to the lens, shaped generally like a 'C', has corresponding longitudinal portions, which insert in corresponding through holes extending in the supporting frame 22 of the respective lens, between the front face and the rear face thereof, with a perpendicular portion of the C-shaped fastening portion which extends between the longitudinal portions for inserting in the longitudinal holes, which are in front of the supporting frame the respective lens.

The means 20, 20 for fastening the bridge body 18 to the respective lens means 12, 12 extend transversely to the lens means 12, 12, in particular transversely to the inside lateral edge of the lens means, and transversely to the respective lateral end face 185, 186 of the bridge body 18.

More specifically, the means 20, 20 for fastening the bridge body 18 to the respective lens means 12, 12 extend transversely to the lens means 12, 12 starting from the rear face, which faces the wearer's face, of the lens means 12, 12.

As illustrated, the means 20, 20 for fastening the bridge body 18 to the respective lens means 12, 12, comprise a respective elongate extension portion 203, 203, in particular in the form of a transversely elongate portion.

Advantageously, the pin portion 201, 201 for articulation of the bridge body 18 extends from the extension, in particular transversal, portion 203, 203, in particular perpendicularly, that is, in use, upwards.

As illustrated, means, in particular perpendicular, 204, 204 are advantageously provided for retaining the bridge body 18 to the first temple portion 201, 201.

The means for retaining the bridge body 18 on the articulation pin portion 201, 201 comprises a respective transversal portion 203, 203, which extends from the articulation pin 201, 201, that is, from the end of it and in particular, in use, from the top end of it The transversal perpendicular retaining portion 204, 204 is designed to engage a corresponding face of the bridge body 18, and in particular an upper face 182 the bridge body 18, in particular at the end, or lateral, portion 193 of the solid bridge body 18.

More specifically, the solid bridge body 18 has transversal dimensions, that is, thickness and height, which are much greater than those of the respective wire-like connecting elements 20.

Advantageously, the perpendicular retaining portion 204, 204 extends defining an angle, in particular greater than 90°, relative to the direction of extension of the transversal extension portion 203, 203.

Figure 1A:
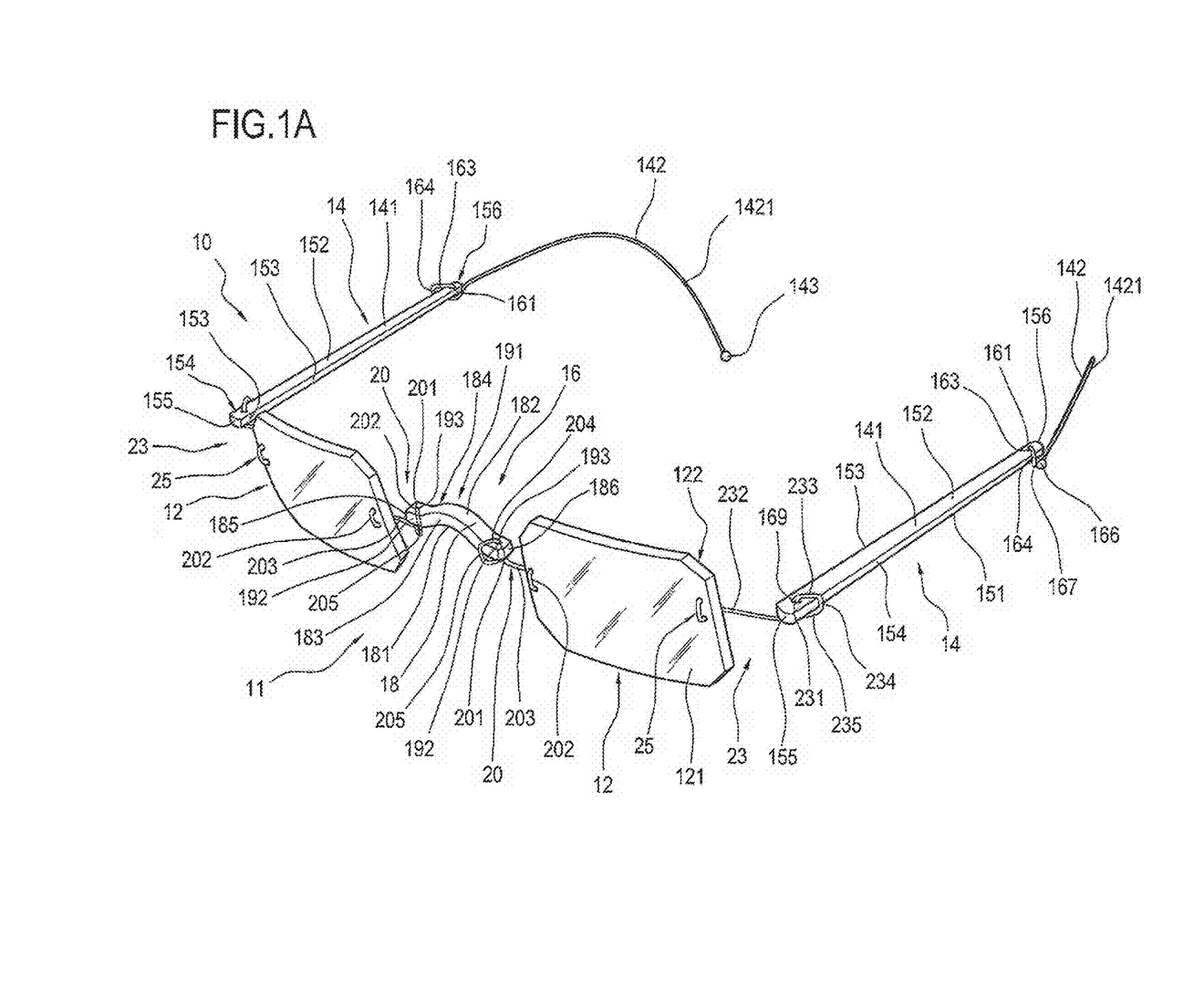
FIG. 1A is a perspective view of a preferred embodiment, in a condition of use, of eyeglasses according to this invention.
Figures 1B, 1C, 1D:
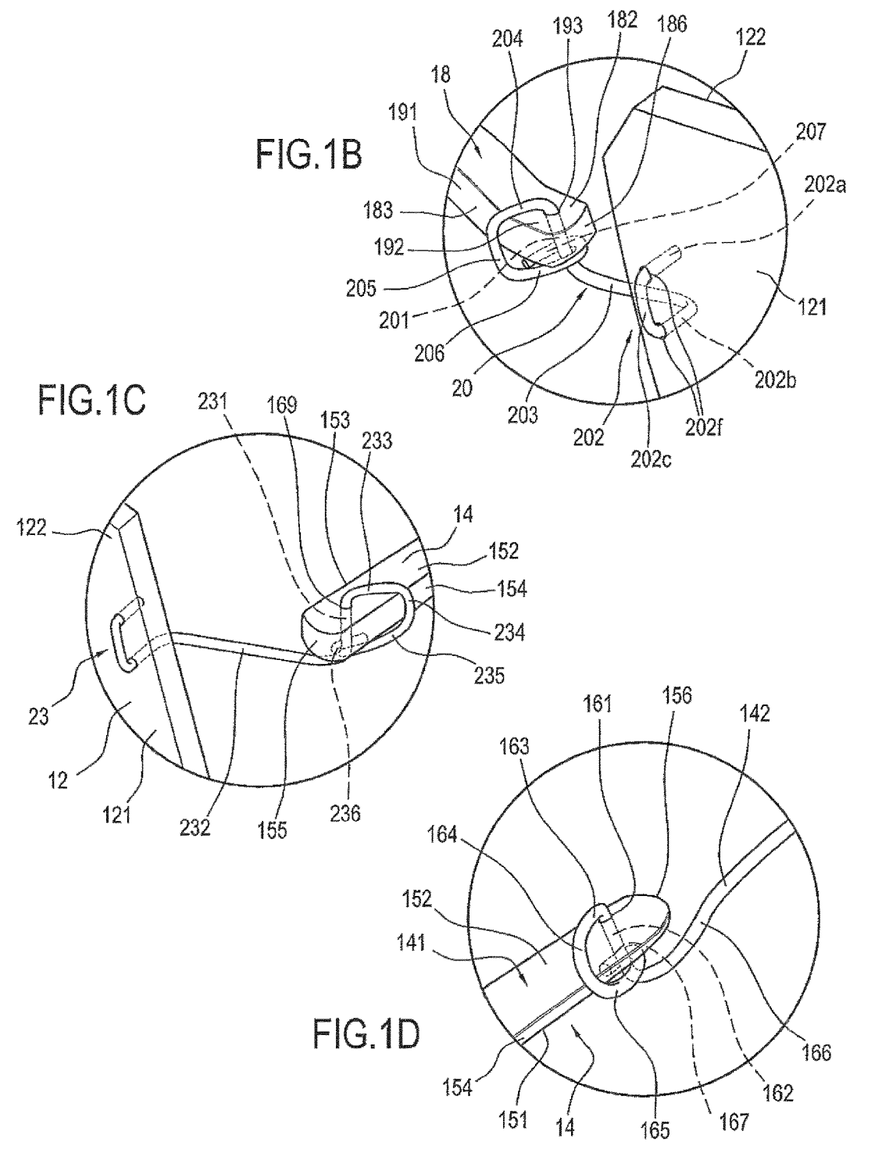
FIG. 1B is a perspective view of an enlarged detail relative to the connecting zone of the bridge to the respective lens of the eyeglasses according to this invention.
FIG. 1C is a perspective view of an enlarged detail relative to the connecting zone of the temple portion to the respective lens of the eyeglasses according to this invention.
FIG. 1D is a perspective view of an enlarged detail relative to the connecting zone of the second part of the temple portion to the first part of the temple portion of the eyeglasses according to this invention.
Figure 2:
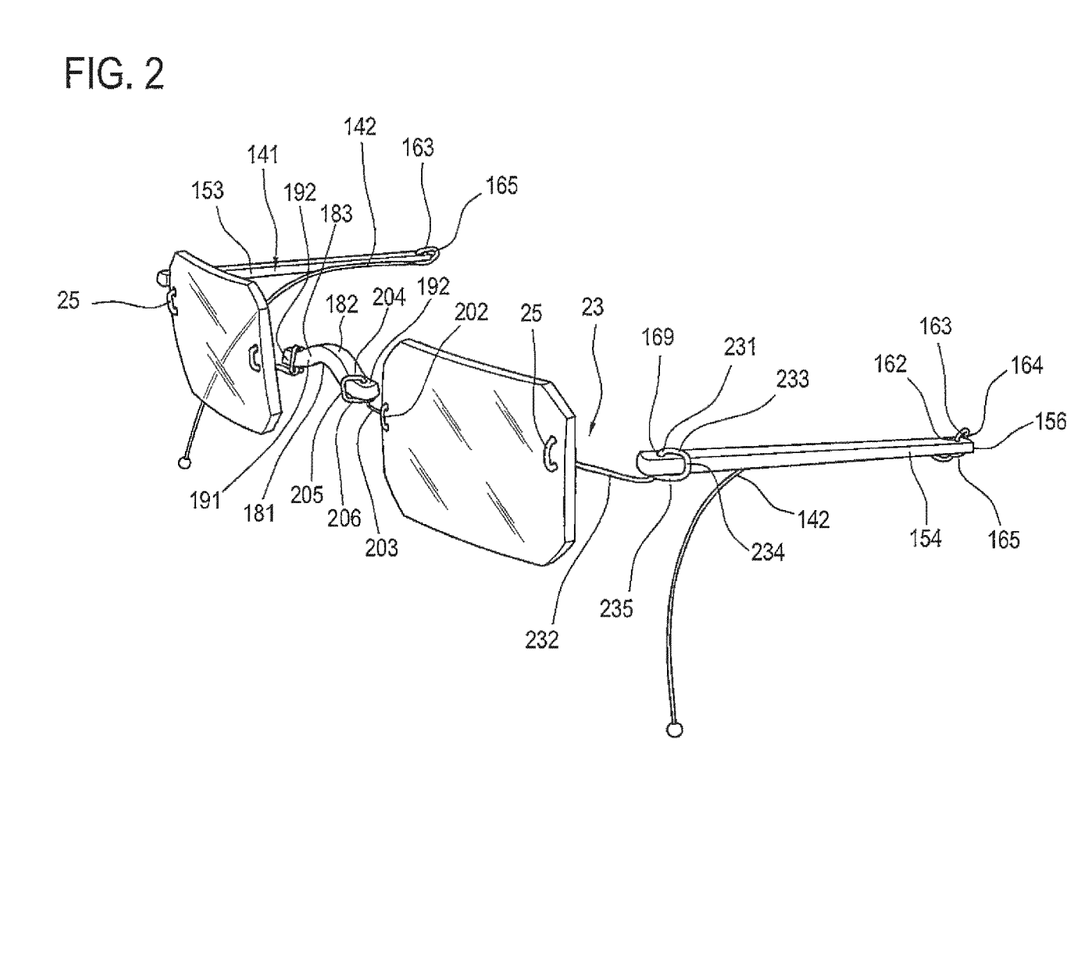
FIG. 2 is a perspective view of the first preferred embodiment of the eyeglasses, with the temple portions partly folded.
Figure 3:
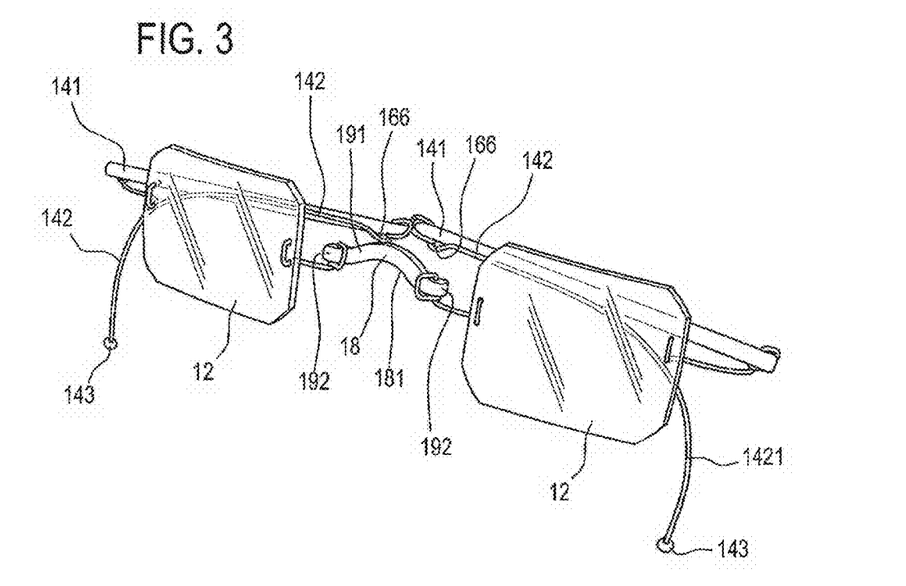
FIG. 3 is a perspective view of the first preferred embodiment of the eyeglasses, with the temple portions fully folded.
Figure 4:
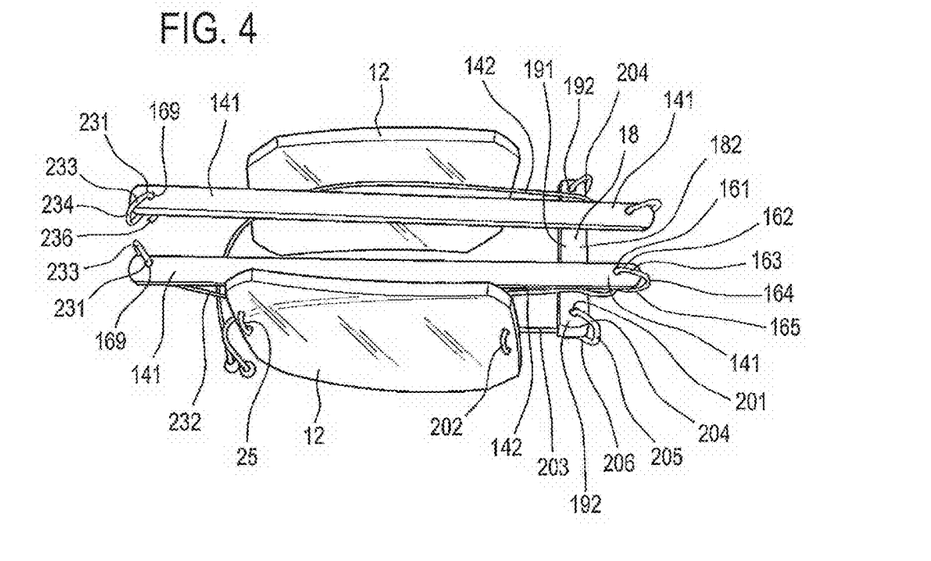
FIG. 4 is a perspective view of the first preferred embodiment of the eyeglasses, in the fully folded condition, ready for insertion in a respective housing case.

Advantageously, there are means for stopping the rotation of the bridge body 18 relative to the means 20, 20 for fastening to the respective lens means 12, 12 in the use, or extended, position, for application to the face of the wearer, as illustrated in FIG. 1A.

Advantageously, the means for stopping the bridge body 18 from turning relative to the means 20, 20 for fastening it to the respective lens means 12, 12 comprise a respective perpendicular portion 205, in particular parallel to the articulation pin portion 201, which engages a corresponding lateral surface, in particular front face, 183, of the bridge body 18, especially at the end, or lateral, portion 193 of the solid bridge body 18.

Advantageously, from the respective free end, in particular lower end, of the rotation stop portion 205, there is a corresponding engagement portion 206, in particular with a hook shaped end 207, which engages the corresponding articulation pin portion 201, in particular with the lower end of it, that is, the transversal portion 203 extending from the respective lens means 12, 12.

According to another aspect, extending from the respective articulation pin portion 201 there is a corresponding annular portion 205, 206 wound around a respective lateral part, in particular front part, of the bridge body 18.

For this reason, one or more of the articulation pin, portion for retaining on the bridge body, rotation stop portion and engagement portion ending with a hook is, or are, made of wire-like material, in particular in a single body with the means for fastening to the lens means.

The eyeglasses also comprise means 14, 14 for hooking to the wearer's face, which are in the form of respective temple means 14, 14 which comprise a first portion 141, 141 of extension of the lens means 12, 12 and a second portion 142, 142 of extension from the respective first portion 141, 141, which is connected to the first portion by corresponding articulation or rotation means, in particular between a use position, wherein the second portion 142 is aligned with the first portion 141, and a rest position wherein the second portion 142 is alongside the first temple portion 141.

Advantageously, the first temple portion 141 is in the form of a corresponding elongate solid body, preferably of general prismatic shape, in particular having a lower face 151, an upper face 152, opposite longitudinal lateral faces 153, 154 and opposite transversal end faces 155, 156.

In turn, advantageously, the second temple portion 142 is in the form of a wire-like element, in particular in the form of a metal wire-like element, in particular comprising a respective arcuate end part 1421 for wrapping around the ear of the wearer.

Advantageously, the body of the first portion 141 has, at a respective rear end, a hole 161 for inserting a pin portion 162 for articulated connection of the second temple portion 142 to the first temple portion 141.

Advantageously, the hole 161, 161 in the body of the respective first temple portion 141 extends, in use, vertically or substantially vertically, and correspondingly the articulated connecting pin portion 162, 162 also extends vertically, or substantially vertically.

More specifically, the hole 161 in the body of the respective first temple portion 141 is in the form of a respective through hole, in particular defined by a corresponding cylindrical surface, which extends between the underside face 151 and the top face 152 of the body 141 of the first temple portion.

Advantageously, the articulation pin portion 162 extends, in particular upwards, and is made as one with the second temple portion 142.

There are, advantageously, means, in particular perpendicular, 142 for retaining the second temple portion, that is to say, the articulation pin portion 162, 162 thereof, to the body of the first temple portion 141.

More specifically, the means of retaining the second temple portion 142, that is, the articulation pin portion 162 thereof, to the body of the first temple portion 141 comprise a respective transversal portion 163, which extends from the articulation pin portion 162 and is designed to engage the corresponding face, in particular the top face 152, of the body of the first temple portion 141.

Advantageously, the retaining portion 163 extends defining a respective angle, in particular an acute angle or less than 90°, relative to the direction of extension of the body, in particular wire-shaped, of the second temple portion 142.

Advantageously, there are means for stopping the rotation of the second temple portion 142 relative to the first temple portion 141 in the respective use, or extended, position, and at which the second temple portion 142 is aligned with the first temple portion 141, with the temple portion preferably in an open condition of use, as illustrated in FIG. 1.

Advantageously, the means for stopping the rotation of the second temple portion 142 relative to the first temple portion 141 comprise a respective portion 164, in particular perpendicular, or parallel, to the articulation pin portion 162, which engages the corresponding lateral face, in particular longitudinal inner face 153, of the body of the first temple portion 141.

More specifically, from the respective free end, especially lower end, of the rotation stop portion 164, there is an engagement portion 165, in particular with a hook-shaped end 167, for engaging the corresponding articulation pin portion 162, that is, the body of the second temple portion 142.

According to another aspect, extending from the respective articulation pin portion 162 there is a corresponding annular portion 164, 165 wound around a respective lateral part of the body 141 of the first temple portion.

For this reason, one or more of the articulation pin, portion for retaining on the first temple portion 141, rotation stop portion and engagement portion ending with a hook is, or are, made of wire-like material, in particular in a single body with the body of the second temple portion 142

Advantageously, the extension body of the second temple portion 142 extends longitudinally relative to the body of the first temple portion 141.

There are means for connecting the main body 142 of the second temple portion to the articulation means 161.

For the purpose, a corresponding portion of mainly perpendicular extension 166 extends from the articulation pin portion 161, from which the main wire-like body 142 of the second temple portion extends, defining a corresponding angle.

The perpendicular portion 166, from which the main part of the second temple portion extends, is connected to the articulation pin portion 161 by a corresponding transversal portion 167, in particular arched upwards, that is, towards the overlying body of the first temple portion.

As illustrated, the transversal portion 167 defines a corresponding angle relative to the transversal portion 162.

A corresponding end of the earpiece, suitably widened, 143 may be arranged, or made, at the opposite end of the second temple portion.

As illustrated, the respective temple portion 14, that is, the first temple portion 141, has, at the end opposite the articulation of the second temple portion 142, a corresponding end hole 169 for insertion of a pin portion 231 of the respective means 23 for fastening to the lens means 12.

The hole 169 also extends, in use, vertically or substantially vertically, for receiving a respective perpendicular pin 231, directed vertically, or substantially vertically.

The insertion hole 169 is in the form of a respective through hole, in particular defined by a corresponding cylindrical surface, which preferably opens, in use, at the upper and lower faces of the body 141 of the first temple portion.

The first temple portion 141 is connected to the lens means 12, in an articulated fashion, using corresponding fixing means 23 which are turn fixed or firmly connected to the lens means 12.

More specifically, the means 23 for fastening the body 141 of the first temple portion comprise a respective connecting portion 25 in the general shape of a 'C', which has corresponding longitudinal portions which are inserted into corresponding through holes extending from the front face of the rear face of the lens means 12, in particular at a lateral end edge, that is, on the outer side, of them.

More specifically, both the C-shaped portions for fastening the lens means, that is, the fastening of the bridge and the fastening of the temple portions, have a perpendicular portion, which connects the longitudinal pin portions which insert in corresponding longitudinal holes of the lenses, the perpendicular portion of which extends on the front face of the lens means.

With regard to the second preferred embodiment of the eyeglasses, illustrated in FIG. 5, the respective portion for connecting to the supporting frame of the lens, in particular at the outer lateral edge thereof which is shaped generally like a 'C', has corresponding longitudinal portions, which insert in corresponding through holes extending in the supporting frame of the respective lens, between the front face and the rear face thereof, with a perpendicular portion of the C-shaped fastening portion which extends between the longitudinal portions for inserting in the longitudinal holes, which are in front of the supporting frame the respective lens.

Advantageously, the means 23 for fastening the body 141 of the first temple portion to the respective lens means 12, 12, comprise a respective extension portion 232, which extends transversally relative to the outer lateral edge of the lens means 12, 12.

Advantageously, the articulation pin 231 for the first temple portion 141 extends perpendicularly, in particular towards the top of the transversal portion 232.

There are advantageously means for retaining the body 141 of the first temple portion to the articulation pin 23 of the lens means 12.

The retaining means comprise a respective transversal portion 233, which extends from the articulation pin 231 and is designed to engage the corresponding face, in particular, in use, the upper face 152, of the body 141 of the first temple portion.

As illustrated, the perpendicular retaining portion 233 extends defining an angle, in particular less than 90°, relative to the transversal extension portion 232.

The means 23 of fastening the temple portion to the lens means 12 also comprise means for stopping the rotation of the temple portion body, in particular the body of the first temple portion 241, relative to the fastening means 23 in the respective use or extended position.

The means for stopping the rotation of the body of the temple portion comprise a respective portion 234, in particular perpendicular, or parallel, to the articulation pin portion 231, which engages with a corresponding longitudinal lateral face, in particular outer face, of the body of the first temple portion 241.

Extending from the respective free end of the stop portion 234 there is an engagement portion 235, in particular with a hook shaped end 236, which engages with the corresponding articulation pin portion 231, that is, with the transversal portion 232 extending from the respective lens means 12.

In other words, from the respective articulation pin portion 231, there is a corresponding annular portion 234, 235 wound around a respective lateral part, in particular outer part, of the body of the first temple portion 241.

More specifically, the solid body 141 of the first temple portion has transversal dimensions, that is thickness, or width, and height, which are much greater than that of the second wire-like temple portion 142 and/or of that of the respective wire-like elements connecting to the respective lens means.

Moreover, as illustrated, the solid body 141 of the first portion of the temple portion has one or more of the longitudinal faces 151, 152, 153, 154 in the form of a flat face.

Advantageously, the bridge body 18 and/or the body of first temple portion 141 is made preferably of one or more of the following materials: horn, wood, plastic, metal, in particular precious metal.

As shown in the folded condition, the second temple portion is located at the inner face of the first temple portion.

Advantageously, as illustrated, in the folded condition, the second temple portion 142 is positioned between the first temple portion 141 and the corresponding lens means 12, 12.

Advantageously, as illustrated, in the folded condition, the temple portions 141, 142 are positioned between the lens means 12, 12.

Advantageously, as illustrated, in the folded condition, the temple portions 141, 142 extend longitudinally beyond the respective lateral edge, respectively inner or outer edge, in particular beyond both the inner and outer lateral edges, of the lens means 12, 12.

Advantageously, as illustrated, in the folded condition, the lens means 12, 12 extend perpendicularly to the bridge body 18.

As illustrated, advantageously, in the folded condition, the lens means 12, 12 extend perpendicularly to the bridge body 18.

As illustrated, advantageously, in the folded condition, the bridge body 18 extends longitudinally spaced from the lens means 12, 12.

Further advantageously, the means 20, 20 for fastening the bridge 18, and/or the means for fastening the temple portion, that is the first temple portion 141, to the lens means 12, and/or the corresponding second temple portion 142, in particular defining a corresponding earpiece, comprise metal wire, preferably in the form of titanium, harmonic spring steel or a precious metal.

The invention described has evident industrial applications. It would be obvious to one skilled in the art that several changes and modifications can be made to the invention without departing from the spirit and scope of the invention, described in depth above. In particular, one skilled in the art could easily imagine further embodiments of the invention comprising one or more of the features described herein. It will also be understood that all the details of the invention may be substituted by technically equivalent elements.

The invention claimed is:

1. Eyeglasses (10) of the folding type comprising
a front part (11) comprising first and second lenses (12, 12) and two respective temple portions (14, 14) for hooking to the wearer's face,
wherein the lenses are connected to each other by a bridge (16) which comprises a bridge body (18) and two wire portions (20, 20) for fastening the bridge body (18) to the respective first and second lenses (12, 12); and
wherein the wire is metal and is adapted to articulate and rotate the bridge body (18) relative to the lenses (12, 12); and
wherein the metal wire (20, 20) for fastening the bridge body (18) to the respective lenses extends transversely to an inside lateral edge of each lens (12, 12) and transversely to a respective lateral end face (185, 186) of each end of the bridge body (18), and
wherein the two wire portions for fastening (20, 20) are connected directly to the inside lateral edge of the lenses (12, 12).

2. The eyeglasses according to claim 1, wherein the two wire portions for fastening (20, 20) are connected to an inside lateral zone of a respective frame (22, 22) for mounting the respective lenses (12, 12), wherein the frame is in the form of a circumferentially extending element which mounts a corresponding lens (12, 12).

3. The eyeglasses according to claim 1, wherein the respective two wire portions (20, 20) define a pin portion (201, 201) which is adapted for insertion into a corresponding hole (193, 193) made in the respective corresponding end portions (192, 192) of the bridge body (18); wherein the pin portion and the hole extend vertically or substantially vertically, in use.

4. The eyeglasses according to claim 3, wherein each hole (193, 193) made in the bridge body (18) is a through hole.

5. The eyeglasses according to claim 3, wherein the each hole (193, 193) made in the bridge body (18) extends between an underside face (181) and a top face (182) of the bridge at the corresponding end portions (192, 192) thereof.

6. The eyeglasses according to claim 5, wherein the two wire portions (20, 20) for fastening the bridge body (18) to the respective lenses comprise a respective elongate extention portion (203, 203) extending transversely to the inside lateral edge of the lenses (12, 12) and/or transversely to the respective lateral end face (185, 186) of the bridge body (18).

7. The eyeglasses according to claim 6, comprising a respective transversal portion (204, 204), which extends from the pin portion (201, 201) and which is adapted to engage the corresponding top face of the bridge body (18); the transversal portion (204, 204) extending in such a way as to make an angle 90° or greater with the elongate extension portion (203, 203).

8. The eyeglasses according to claim 3, wherein the pin portion (201, 201) for articulation of the bridge body (18) extends perpendicularly upwards from the elongate extension portion (203, 203) in use.

9. The eyeglasses according to claim 3, wherein it comprises rotation stop for stopping the bridge body (18) from turning relative to the two wire portions (20, 20) for fastening it to the respective lenses (12, 12) in the extended use position, the rotation stop for stopping the bridge body (18) from turning relative to the two wire portions (20, 20) for fastening it to the respective lenses (12, 12) comprising a respective portion (185, 185) which is perpendicular or parallel to the pin portion and which engages a corresponding front face (183), of the bridge body (18).

10. The eyeglasses according to claim 9, comprising a free end of the rotation stop portion (185, 185) and extending from the free end there is an engagement portion (206, 206) with a hook shaped end, which engages the corresponding pin portion (201, 201).

11. The eyeglasses according to claim 3, wherein extending from the respective pin portion (201, 201) there is a corresponding annular portion (205, 206) wound around the respective lateral end portion of the bridge body (18).

12. The eyeglasses according to claim 1, wherein the two wire portions (20, 20) for fastening the bridge body (18) to the respective lenses are fixedly, or firmly, connected to the lenses (12, 12) and comprise a respective fastening portion (202, 202) in the general shape of a C, which is inserted into corresponding through holes extending between a front face (121) and a rear face (122) of the lenses (12, 12) themselves.

13. The eyeglasses according to claim 1, wherein the bridge body (18) is made of one or more of the following materials: horn, wood, plastic, metal, precious metal.

14. The eyeglasses according to claim 1, wherein the two wire portions (20, 20) for fastening the bridge comprise metal wire in the form of titanium, harmonic spring steel or precious metal.

15. Eyeglasses (10) of the folding type comprising
a front part (11) comprising first and second lenses (12, 12) and two respective temple portions (14, 14) for hooking to the wearer's face,
wherein the lenses are connected to each other by a bridge (16) which comprises a bridge body (18) and two wire portions (20, 20) for fastening the bridge body (18) to the respective first and second lenses (12, 12); and
wherein the wire is metal and is adapted to articulate and rotate the bridge body (18) relative to the lenses (12, 12); and
wherein the metal wire (20, 20) for fastening the bridge body (18) to the respective lenses extends transversely to an inside lateral edge of each lens (12, 12) and transversely to a respective lateral end face (185, 186) of each end of the bridge body (18), and
wherein the bridge body (18) comprises a nosepiece by which the eyeglasses are rested on the wearer's nose, wherein the nosepiece comprises an underside surface (181) resting on the wearer's nose.

16. Eyeglasses (10) of the folding type comprising
a front part (11) comprising first and second lenses (12, 12) and two respective temple portions (14, 14) for hooking to the wearer's face,
wherein the lenses are connected to each other by a bridge (16) which comprises a bridge body (18) and two wire portions (20, 20) for fastening the bridge body (18) to the respective first and second lenses (12, 12); and
wherein the wire is metal and is adapted to articulate and rotate the bridge body (18) relative to the lenses (12, 12); and
wherein the metal wire (20, 20) for fastening the bridge body (18) to the respective lenses extends transversely to an inside lateral edge of each lens (12, 12) and transversely to a respective lateral end face (185, 186) of each end of the bridge body (18), and
wherein the bridge body (18) comprises a respective central portion (191) with an arcuate shape and a respective concavity which, in use, is directed downwards towards the wearer's nose, and/or comprises corresponding end portions (192, 192) defining hinges for the two wire portions(20, 20) for fastening to the corresponding lenses (12, 12).

* * * * *